Dec. 8, 1970

C. F. McCAULEY 3,546,598

CONTROL CIRCUIT FOR LIMITING OUTPUT PARAMETERS

Filed July 22, 1969

INVENTOR.
Charles F. McCauley
BY
C. L. Meland
ATTORNEY

United States Patent Office 3,546,598
Patented Dec. 8, 1970

3,546,598
CONTROL CIRCUIT FOR LIMITING OUTPUT PARAMETERS
Charles F. McCauley, Speedway, Ind., assignor to General Motors Corporation, Detroit, Mich., a corporation of Delaware
Filed July 22, 1969, Ser. No. 843,658
Int. Cl. F02c 9/04
U.S. Cl. 328—71                    6 Claims

ABSTRACT OF THE DISCLOSURE

A circuit for varying a primary input parameter to a system to limit the primary and one or more secondary system output parameters dependent upon the primary input parameter. A separate operational amplifier is associated with each different output parameter. Of these amplifiers, one is a primary amplifier that receives the feedback of the primary output parameter as an input and provides an output operative to alter the primary input parameter, and the other amplifiers are secondary amplifiers that receive feedback of the secondary output parameters as inputs. In addition to being connected to means feeding back the actual magnitude of the associated parameter, the input terminal of each amplifier is also connected to means for limiting each output parameter. A pair of output resistors connects the output terminal of each secondary amplifier to the output of the primary amplifier. A diode is connected from the junction of the output resistors to the input of the primary amplifier, thereby allowing the output of a secondary amplifier to slave the output of the primary amplifier when the feedback signal to a secondary amplifier exceeds its commanded limit. The control circuit is then operative to cause the output from the primary amplifier to change the primary input parameter until the feedback signal associated with the out-of-limit output parameter is restored within its limit.

---

The invention herein described was made in the course of work under a contractor subcontract thereunder with the Department of Defense.

This invention relates to a control circuit for varying a primary input parameter to a system to limit a primary and several secondary output parameters dependent upon the primary input parameter.

A system often has several primary and secondary performance-related output parameters dependent on a primary input parameter. The primary input parameter is usually adjusted so that an output corresponding thereto follows a commanded schedule or limit. But, for safety, efficiency, accuracy, stability and other purposes, all such parameters must be kept below predetermined limits. For instance, in a jet engine, fuel flow may be considered a primary parameter affecting other parameters such as turbine inlet temperature, turbine shaft r.p.m., generator output, etc. Each of the latter parameters increases or decreases as the fuel flow increases or decreases, but may also vary in response to factors other than fuel flow. The fuel flow itself must be adjusted to follow a desired schedule or command. Moreover, should such a secondary parameter exceed its preselected limit, either because the fuel flow is too high or for other reasons, such parameter must be brought within its limits by adjusting the fuel flow. Thus, it is often desirable to limit the inlet temperature to a turbine of a jet engine by adjusting fuel flow. Such temperature has a large influence on engine life and is sensitive to factors such as altitude and required horsepower in addition to fuel flow. It is, therefore, desirable to provide a control circuit that adjusts a primary input parameter when a primary or secondary parameter exceeds a predetermined level, and it is also desirable to provide such corrections rapidly and in a manner that preserves overall system stability.

Such limiting action is provided in the present invention by a circuit comprised of operational amplifiers interconnected by diodes and resistors. A separate operational amplifier is used for each output parameter to be limited. One such operational amplifier moreover is associated with a system output corresponding to the primary system input parameter and is operative to increase or decrease this input parameter and thereby also the secondary system output parameters. The input to each amplifier is connected to feedback means that indicate the magnitude of the associated system output parameter and also to reference means by which the limits of such parameters are established. The difference between the feedback signal and the reference signal establishes one input for each amplifier. When the feedback to the input of an amplifier exceeds its associated reference level, the amplifier is operative to produce an output proportional to the difference between the feedback and limit but inverted as to the polarity therebetween. The output of the primary amplifier receiving the primary output parameter is connected by separate pairs of impedances to each of the outputs of the secondary operational amplifiers receiving feedbacks corresponding to the other apparatus output parameters. A diode is connected forwardly from between these impedances to the input of the primary amplifier. When the feedback to the input of the secondary amplifier exceeds its associated reference level, the diode conducts the output from the secondary amplifier to the input of the primary amplifier to slave the output of the latter to the output of the former. In order to improve the accuracy with which each parameter can be controlled, the feedback about each amplifier includes a resistor and integrating capacitor to effect a proportional-plus integral control. Moreover, to render each secondary amplifier in a condition to slave primary amplifier promptly when a secondary process parameter exceeds its predetermined limit, another diode is connected forwardly from the input of the secondary amplifier to between the impedances connecting the amplifier outputs.

It is, therefore, a primary object of this invention to provide a control circuit for maintaining two or more system output parameters below predetermined limits.

It is another object of this invention to provide a control circuit for maintaining two or more system output parameters below preselected limits by manipulation of a system input parameter.

It is a further objective to provide a circuit of the foregoing type wherein a parameter exceeding its limit can assume control of the primary process input parameter to effect a correction.

It is another object to provide a control circuit of the foregoing type comprised of two or more operational amplifiers each associated with a different system output parameter to be limited wherein the output of one operational amplifier slaves the output of a second amplifier by means of a diode connected between the output of the former and the input of the latter.

It is still a further and more specific objective to provide a circuit of the foregoing type that includes means connected in feedback about each amplifier to effect a proportional-plus integral control between the output and input thereof and also a diode connected between such output and input to render each amplifier in a condition whereby the amplifier promptly assumes control of the primary system input parameter when the system output associated with the amplifier exceeds its predetermined output limit.

The invention embodies other novel features, details of which are hereinafter set forth in the specification and claims and illustrated in the accompanying drawings, wherein:

Figure 1:
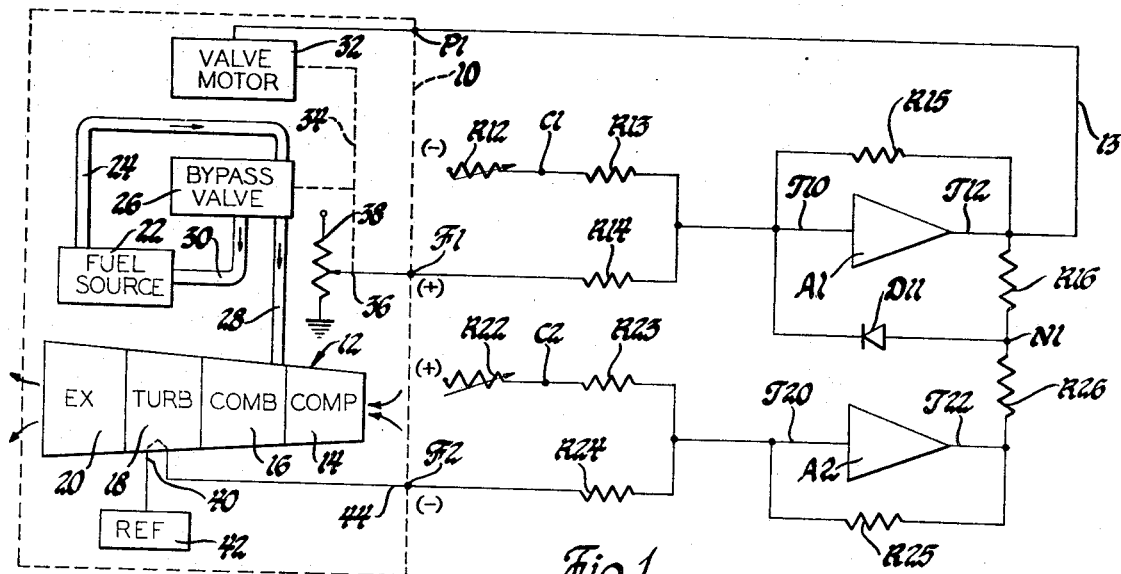
FIG. 1 is a schematic representation of a circuit whereby a primary system input parameter can be controlled by either of two system output parameters.

Although the parameter control system of this invention can be used to control various apparatus, it will be described with regard to the fuel control system of a jet engine as one example of its utility. Referring now to FIG. 1, there is shown a fuel control system 10 for a jet engine generally designated by reference numeral 12. This system controls a supply of fuel to conventional jet engine 12 having a compressor 14, a combustion chamber 16, a drive turbine 18, and an exhaust chamber 20. The fuel for engine 12 is supplied to combustion chamber 16 from a fuel source 22 via a feed pipe 24, bypass valve 26, a pump (not illustrated), and combustion chamber inlet pipe 28 with the bypassed flow returned to source 22 via bypass pipe 30.

The bypass valve 26, as is known to those skilled in the art, controls the amount of fuel supplied to the engine and preferably is the same type as that disclosed in U.S. Pats. 2,938,340 and 3,124,932. The setting of bypass valve 26 is controlled by a conventional electric motor 32 which moves bypass valve 26 via a gearing linkage 34 illustrated by the dotted lines in FIG. 1. Linkage 34 is also mechanically connected to and adjusts first feedback means in the form of wiper arm 36 of potentiometer 38 connected to a source of direct current which is not illustrated. The wiper arm 36 is connected to output feedback terminal F1 and provides a variable positive direct current potential at terminal F1 which is a function of the setting of bypass valve 26. The inlet temperature to turbine 18 of jet engine 12 is sensed by second feedback means in the form of thermocouple 40, one lead of which is connected to thermocouple cold-junction temperature reference means 42 and the other lead of which is connected to the apparatus output feedback terminal F2, as shown. Feedback terminals F1 and F2 are connected with operational amplifiers A1 and A2, respectively, and are respectively connected to inverting input terminals T10 and T20 thereof across input resistors R14 and R24, as shown. The output terminal T12 of amplifier A1 is connected to apparatus input terminal P1 of apparatus 10 by means of connector 13.

When commanded by a positive signal applied to apparatus input terminal P1, valve motor 32 mechanically adjusts bypass valve 26 via gearing 34 to increase the fuel flow from fuel source 22 through feed pipe 24 and inlet pipe 28. As bypass valve 26 channels more fuel to inlet pipe 28, potentiometer wiper arm 36 is moved to provide an increased positive potential at output feedback terminal F1. As a result of the increased fuel flow into combustion chamber 16, the temperature in turbine 18 is increased and, therefore, the signal appearing at apparatus output feedback terminal F2 is similarly increased but in a negative sense.

A variable impedance R12 which takes the form of a variable resistor is provided for establishing a command reference voltage to input terminal T10 of amplifier A1. The resistor R12 is connected between a suitable source of direct current negative voltage which is not illustrated and command terminal C1, and command terminal C1 is connected in series with command resistor R13 and in parallel with input resistor R14 to input terminal T10 of amplifier A1. Variable impedance R22 is for similarly establishing a reference voltage to input terminal T20 of amplifier A2 and is connected from a suitable source of positive DC potential (not shown) to command terminal C2. Command terminal C2 in turn is connected in series with resistor R23 and then in parallel with resistor R24 to input terminal T20 of amplifier A2. While variable impedances R12 and R22 are shown schematically as manually adjustable potentiometers in FIG. 1, such impedances could also be automatically controlled or could be the outputs of other references voltage generating devices, such as function generators or otherwise.

Resistors R15 and R25 are connected in feedback respectively across input and output terminals T10 and T12 of amplifier A1 and terminals T20 and T22 of amplifiers A2. The outputs of amplifiers A1 and A2 are interconnected by series resistors R16 and R26 defining a junction or node N1 therebetween for comparing the outputs from A1 and A2 to determine which one assumes control. Node N1 between resistors 16 and 26 is connected to the anode of diode D11, the cathode of which is connected to the input of amplifier A1 as shown. This provides a path connecting the output terminal T22 of amplifier A2 to input terminal T10 of amplifier A1 and also a second feedback path around amplifier A1 from terminal T12 to terminal T10 thereof.

Typical values of the components associated with the above-described circuits are resistances of 50K ohms for input resistors R13, R14, R23 and R24; one megohm for feedback resistors R15 and R25; and 10K ohms for balanced (equal value) output-comparing resistors R16 and R26. Diode D11 may be an IN4009 type switch diode having a peak inverse voltage rating of 25 volts. Operational amplifiers A1 and A2 may be Philbrick Model P65A having one input grounded, a minimum 20,000 volt/volt open loop gain into a 5K output load and a 60,000 volt/volt typical gain into a 100K output load. The outputs can be ±11 volts and ±2 milliamperes. The amplifiers are connected in a conventional manner with a power supply (not shown) providing a direct current bias source and with compensations to enhance stability over the range of anticipated operation.

As is known to those skilled in the art, the gain of an operational amplifier may be determined by the ratio of its feedback resistance to its input resistance. The effective input resistance to amplifiers A1 and A2 in the circuit of FIG. 1 is approximately 50K ohms as determined by the 50K ohms values of input resistors R13, R14, R23, and R24. When either amplifier A1 or A2 is in control, as will be more fully described below, the feedback resistance thereabout is determined respectively by the 1 megohm values of R15 and R25 providing a gain of 20 (i.e., 1 megohm/50K) through amplifier A1. Moreover, when amplifier A2 is in control to slave amplifier A1, the feedback resistance around amplifier A1 is reduced to effectively the 10K value of resistance R16, thereby reducing the gain through amplifier A1 sharply. This renders the control system relatively insensitive to the difference in potentials appearing at terminals F1 and C1 but highly sensitive to the difference in potentials appearing at terminals F2 and C2. Thus, resistances R13, R14, R15, and R16 associated with amplifier A1 and resistances R23, R24, R25, and R26 for amplifier A2 are chosen to effect high gains compatible with system stability and accuracy when the respective amplifiers are in control and to render the amplifiers comparatively ineffective in effecting system changes when the amplifiers are not in control.

Connections of terminals P1, C1, F1, C2, and F2 are made within the system to effect signals at these terminals having polarities, as shown. For the embodiment shown, the primary input parameter (fuel supply) at system input terminal P1 is controlled by a positive feedback potential at terminal F1 and a negative reference at command terminal C1. The secondary system output (turbine inlet temperature) is controlled by negative feedback at terminal F2 and positive reference at command terminal C2. Moreover, system feedback terminal F1 is mechanized to be less positive than the signal at command terminal C1 is negative when the feedback from terminal F1 is within the limit set at terminal C1. The signal at system feedback terminal F2 is similarly mechanized to have a smaller absolute (negative) value than the absolute (positive) value of the signal at command terminal C2 when the feedback at terminal F2 is within the limit set at terminal C2. Under normal conditions of system operation, as will be more fully explained below, this set of polarity relationships results in a signal at inverting input terminal T10 of amplifier A1 that is normally slightly negative so that terminal T12 thereof is normally slightly positive, and a signal at input terminal T20 of amplifier A2 that is normally positive so that the terminal T22 thereof is normally negative.

OPERATION

The operation of the system shown in FIG. 1 will be explained first for the case where the feedback signal at apparatus output terminal F1 is near but slightly less than the command signal at terminal C1 while the signal at terminal F2 is much less than that at terminal C2. In this situation an C1–F1 error signal is applied to input terminal T10 of amplifier A1 which is slightly negative to cause a positive output signal to be developed at output terminal T12 of amplifier A1. This causes system 10 to sustain the signal at terminal F1. In other words, the positive signal at terminal T12 is communicated to input terminal P1 of system 10 and there tends to alter the position of bypass valve 26 so as to increase the signal applied to terminal F1, here making it more positive, until the difference between the signals at terminals F1 and C1 is reduced as close to zero at input terminal 10 as permitted by loop gain. To have the condition above described, the system is so arranged that the command signal from terminal C2 grossly exceeds the feedback signal at terminal F2 to provide a positive signal at the input terminal 20 of amplifier A2 and a negative signal at output terminal T22 corresponding to the saturation level of amplifier A2. However, this large saturated negative signal at the output T22 of amplifier A2 is compared with the nominal within-limit signal at output terminal T12 of amplifier A1 by output resistors R16 and R26. Node N1 between resistors R16 and R26 is thus negative under these conditions. Since diode D11 therefore does not conduct, the output terminal T22 of amplifier A2 remains substantially at the negative saturation level as the voltage at terminal F1 is brought into correspondence with that at terminal C1 even though the voltage at terminal F2 is thereby increased, (i.e., here made more negative). Moreover, as long as the output at terminal T22 of amplifier A2 is sufficiently negative compared to the output of terminal T12 of amplifier A1, diode D11 prevents amplifier A2 from driving or slaving amplifier A1 and assuming control of the fuel flow in system 10.

The mode of operation just described is considered the normal mode since system operation is effected primarily by varying the command signal for the primary input parameter and matching the output feedback associated therewith. In such normal operation, the secondary parameters would vary with the primary parameter but would stay below their associated command limits except in unusual modes or malfunctions. In describing operation in the presence of such unusual mode, the absolute value of voltage at terminal C1 is assumed equal or slightly greater than that at terminal F1, thereby indicating the primary process output parameter to be within limits. The resulting null or slightly negative value at input terminal T10 to amplifier A1 still produces a positive output at terminal T12 thereof, tending to increase the magnitude of F1. But with the voltage at terminal F2 now approaching that at terminal C2, the signal at terminal T22 of amplifier A2 starts to decrease and leave the negative saturation level. When the output signal at terminal 22 approaches the value at terminal T12 of amplifier A1, the potential at the node N1 junction of the R16–R26 balanced. equal-resistance comparison circuit aproaches zero. Then, as the voltage at terminal F2 exceeds that at terminal C2, the voltage at node N1 passes through zero and goes positive, and diode D11 starts to conduct current from output terminal T22 of amplifier A2 to input terminal T10 of amplifier A1. This reduces the voltage at output terminal T12 of amplifier A1 to cause the system 10 to reduce the potentials at feedback terminals F1 and F2 similar to the manner described previously.

While amplifier A2 is thus in control of the system through amplifier A1, the signal at terminal F1 is relatively ineffective in causing system change compared to effectiveness of the output of amplifier A2 because the feedback around amplifier A1 is then through output resistor R16 and conducting diode D11. Since resistor R16 in this mode also serves as a feedback resistor for amplifier A1, it is selected to have a value much less than that of R15 to reduce the gain of amplifier A1 when controlled by amplifier A2. A signal at terminal F2, however, is effective through the full gain of amplifier A2 which in turn slaves amplifier A1 via diode D11. As the signal at terminal F1 continues to fall below the set point established at terminal C1 in response to the action of amplifier A2, more of the input current for amplifier A1 is provided through diode D11 which can conduct a large amount of current with only about a 0.5 volt drop thereacross. The difference between the signals appearing at terminals C1 and F1 still causes some current from terminals F1 to flow into terminal T10 and some current from the output of amplifier A1, but the effect of this current on system operation is reduced by the ratio of R16 to R15 and is not paramount in the A1 output as compared to the effect of A2. The difference in potentials appearing at terminals C2 and F2, however, must be sufficient to support the output of amplifier A2 which in turn has to servo the output of amplifier A1.

The 0.5 volt drop across diode D11 when amplifier A2 is in control commands that the output of amplifier A2 exceed that of amplifier A1 by about 1 volt since the inputs of operational amplifiers conventionally degenerate to zero volts or virtual ground and since 0.5 milliamp through both resistors R16 and R26 also produce a 0.5 volt drop across each. This current through resistor R16 is small compared to ±2 milliamp output capability of amplifier A1 so that amplifier A1 when thus slaved is still in its linear region.

Figure 2:
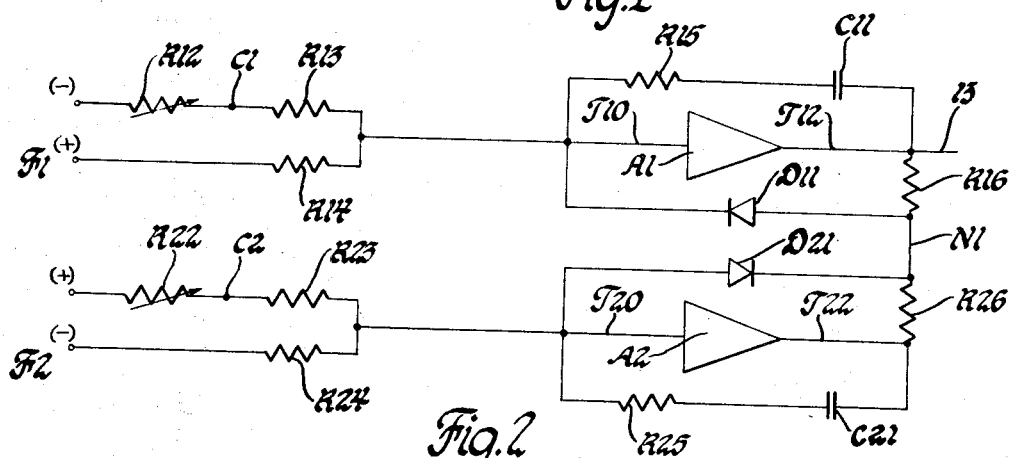
FIG. 2 is a schematic representation of a circuit of the foregoing type wherein proportional-plus integral means and diode means are employed to provide an accurate and prompt response when a system output parameter exceeds its predetermined level.

The circuit shown in FIG. 2 is substantially identical in configuration and component value as that of FIG. 1 except for two differences and may also be used to control the fuel control system 10 of FIG. 1. The first difference is that capacitors C11 and C21 are connected in series with feedback resistors R15 and R25 respectively, thereby effecting a proportional-plus integral channel around amplifiers A1 and A2, known to those skilled in the art, as shown. The second difference is associated with the addition of capacitors C11 and C21 and is the inclusion of diode D21 of type similar to D11 to prevent saturation of amplifier A2 while not in control.

Since the charge on capacitors C11 and C21 varies in magnitude with the duration of an error signal at input terminals T10 and T20 of amplifiers A1 and A2, an output signal may be provided at terminals T12 and T22 thereof even though the inputs at terminals T10 and T20 may have been substantially nulled. Capacitors C11 and C21 thereby render the control circuit sensitive to both the duration and magnitude of an error signal rather than just its magnitude, this type of control being desirable where the errors to be corrected are small such as in a tight servo loop. To render output terminal T22 of amplifier A2 at substantially the same potential as output terminal T12 during the periods when amplifier A2 is not in control as when capacitor C11 provides an output on terminal T12, diode D21 is connected with its anode to input terminal T20 of amplifier A2 and its cathode to node N1 between resistors R16 and R26, as shown. During the period that amplifier A1 is in control because of an out-of-limit difference between terminals F1 and C1 communicated to input terminal T10 of amplifier A1 and thereby reverse biasing diode D11, small errors might still be introduced from terminals F2 and C2 to input terminal T20 of amplifier A2. Without diode D21, capacitor C21 could then be charged to provide a substantial negative error at output terminal T22 of amplifier A2, perhaps even negatively saturating the amplifier. Then, should feedback at terminal F2 suddenly change to exceed its command at terminal C2, considerable time would be needed to discharge capacitor C21 before a positive output would appear at terminal T22 to slave amplifier A1 and in turn system 10. This period is substantially eliminated by the connection of diode D21 since diode D21 serves to keep input terminal T20 and output terminal T22 at approximately the same potential by effectively connecting the two. In the present case, the difference between input and output potentials would be the 0.5 volt forward drop of diode D21 and the 0.5 volt drop across comparing resistor R26.

Figure 3:
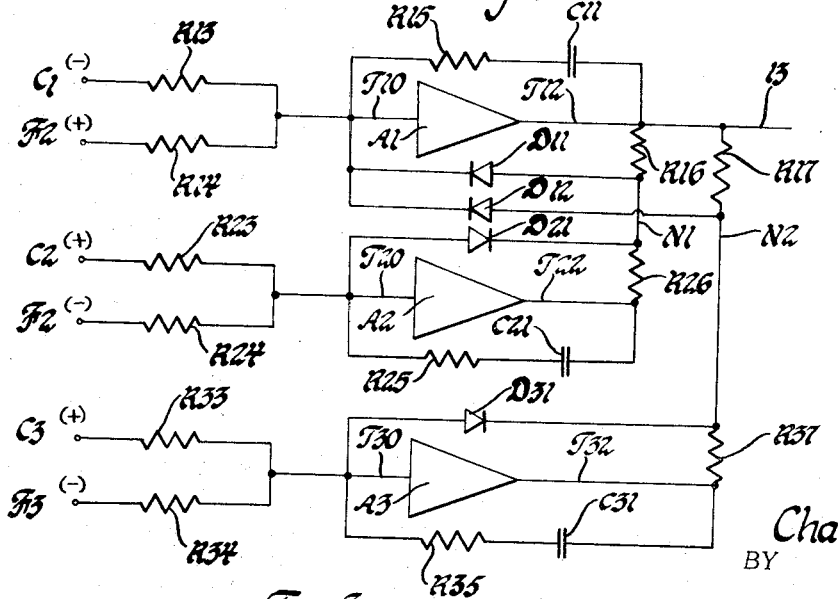
FIG. 3 is a schematic representation of a circuit whereby amplifiers associated with a primary and two secondary system output parameters are interconnected to enable that parameter exceeding its predetermined level to accurately and expediently assume control of the primary input parameter.

The circuit shown in FIG. 3 is substantially identical in configuration and component value as that of FIG. 2 with the only difference being that circuitry has been included to control a third output parameter. Such an output could for instance be the r.p.m. of the jet engine turbine 18 in system 10. This r.p.m. could moreover be measured by tachometer or by an electromagnetic pickup feeding a frequency-to-DC converter to provide a feedback at terminal F3 tracking a command at terminal C3. As shown in FIG. 3, amplifier A3 has an input terminal T30, an output terminal T32, and series resistance capacitance R35 and C31 respectively connected thereacross. Input terminal T30 is connected to the parallel combination of command resistor 33 and feedback resistor 34 suitably connected to system feedback terminal F3 (turbine r.p.m.) and r.p.m. command terminal C3, these terminals mechanized with polarities as shown similar to the polarizations of terminals C2 and F2. Output terminal T32 of amplifier A3 is connected to output terminal T12 of amplifier A1 by means of resistors R17 and R37 defining node N2 therebetween. Diode D12 is connected from node N2 to input terminal T10 of amplifier A1, and diode D31 is connected between input terminal T30 and node N2. The operation of the circuit shown in FIG. 3 is substantially identical to that explained above with reference to FIGS. 1 and 2, diodes D11 and D12 enabling amplifiers A2 and A3 respectively to slave amplifier A1 when the comparison circuits at nodal points N1 and N2 indicate that an associated feedback exceeds its command. Moreover, diodes D21 and D31 serve to reset and prevent saturation of amplifiers A2 and A3 to allow them to assume control of A1 promptly.

Having described one embodiment of the present invention, it is understood that those specific terms and examples are employed in a descriptive sense and not for the purpose of limitation. Other embodiments of the invention may be practiced as for instance using differential amplifiers summing commands and feedbacks of like polarities at their input terminals rather than summing signals of opposite polarities as with the embodiment described.

What I claim as new and desire to secure by Letters Patent of the United States is:

1. In a system for limiting a plurality of output parameters responsive to an input parameter comprising:
   (a) an apparatus to be controlled having an input terminal and first and second output terminals, said apparatus including means operative to produce signals at said output terminals varying in accordance with a signal applied to said input terminal;
   (b) a primary amplifier having an input terminal connected to said first apparatus output terminal and an output terminal connected to said apparatus input terminal;
   (c) a secondary amplifier having an input terminal connected to said second apparatus output terminal and having an output terminal;
   (d) first and second voltage reference means connected respectively to said input terminals of said primary and secondary amplifiers;
   (e) first and second output impedances defining a node therebetween connected in series between said amplifier output terminals;
   (f) and an unidirectional conducting device having an anode connected to said node and a cathode connected to said primary amplifier input terminal, said device operative to conduct the output of said secondary amplifier to drive said primary amplifier when the value of the voltage at said second apparatus output terminal exceeds the value of said second voltage reference.

2. In a system for limiting a plurality of output parameters responsive to an input parameter comprising:
   (a) an apparatus to be controlled having an input terminal and first and second output terminals, said apparatus including means operative to produce signals at said output terminals varying in accordance with a signal applied to said input terminal;
   (b) a primary operational amplifier having an input terminal connected to said first apparatus output terminal and an output terminal connected to said apparatus input terminal;
   (c) a secondary operational amplifier having an input terminal connected to said second apparatus output terminal and having an output terminal;
   (d) first and second voltage reference means connected respectively to said input terminals of said primary and secondary amplifiers;
   (e) first and second feedback impedance means connected across said input and output terminals of said primary and secondary amplifiers respectively;
   (f) first and second output impedances defining a node therebetween connected in series between said amplifier output terminals;
   (g) and an unidirectional conducting device having an anode connected to said node and a cathode connected to said primary amplifier input terminal, said device operative to conduct the output of said secondary amplifier to drive said primary amplifier when the absolute value of the voltage at said second apparatus output terminal exceeds the absolute value of said second voltage reference.

3. In a system for limiting a plurality of output parameters controlled by an input parameter comprising:
   (a) an apparatus to be controlled having an input terminal and first and second output terminals, said apparatus including means operative to produce signals at said output terminals varying in accordance with a signal applied to said input terminal;
   (b) first and second signal magnitude establishing means connected respectively to said first and second apparatus output terminals;
   (c) primary and secondary operational amplifiers each having an input and output terminal, said amplifier input terminals connected respectively to said apparatus first and second output terminals and said first amplifier output terminal connected to said apparatus input terminal;
   (d) first and second feedback impedance means connected across said input and output terminals of said primary and secondary amplifiers respectively, said impedance means comprised of a resistor and capacitor in series whereby integration of the signal appearing at a respective input terminal of an amplifier is performed;

(e) first and second output impedances defining a node therebetween connected between said amplifier output terminals;

(f) and an unidirectional conducting device having an anode connected to said node and a cathode connected to said first amplifier input terminal; said device operative to enable the output of said second amplifier to drive said first amplifier when the absolute value of the voltage at the said second apparatus output terminal exceeds the absolute value of said second voltage reference.

4. In a system for limiting a plurality of output parameters responsive to an input parameter comprising:

(a) an apparatus to be controlled having an input terminal and first and second output terminals, said apparatus including means operative to produce signals at said output terminals varying in accordance with a signal applied to said input terminal;

(b) a primary operational amplifier having an input terminal connected to said first apparatus output terminal and an output terminal connected to said apparatus input terminal;

(c) a secondary operational amplifier having an input terminal connected to said second apparatus output terminal and having an output terminal;

(d) first and second voltage reference means connected respectively to said input terminals of said primary and secondary amplifiers;

(e) first and second feedback impedance means connected across said input and output terminals of said first and second amplifiers respectively;

(f) first and second output impedances defining a node therebetween connected in series between said amplifier output terminals;

(g) a first unidirectional conducting device having an anode connected to said node and a cathode connected to said first amplifier input terminal, said first device operative to drive said first amplifier when the absolute value of the voltage in the said second apparatus output terminal exceeds the absolute value of said second voltage reference;

(h) and a second unidirectional conducting device having an anode connected to said second amplifier input terminal and a cathode connected to said node, said second device operative to maintain said second amplifier in a condition to assume control of first said amplifier promptly when the absolute value of the voltage at said second apparatus output terminal exceeds the absolute value of said second voltage reference.

5. A control system comprising:

(a) a first operational amplifier having an input terminal and an output terminal and feedback impedance connected therebetween;

(b) a second operational amplifier having an input terminal and an output terminal and feedback impedance connected therebetween;

(c) an apparatus to be controlled having an input terminal and two output terminals, said apparatus input terminal connected with said output terminal of said first operational amplifier and said apparatus output terminals providing signals varying in accordance with a signal applied to said input terminal;

(d) first and second feedback means connected respectively between said apparatus output terminals and said amplifier input terminals whereby feedback signals are provided from said apparatus at said amplifiers;

(e) first and second sources of reference voltages connected respectively with said input terminals of said operational amplifiers, said feedback signals and said reference voltages controlling the output voltages of said amplifiers;

(f) first and second output impedances defining a node therebetween connected between said output terminals of said amplifiers, said impedances establishing a reference potential at said node; and (g) first and second unidirectional current conducting devices connected between said node and said input terminal of a respective operational amplifier, the anode of one said devices connected to said node and the cathode of the other said devices connected to said node, whereby said one device conducts to drive the input of said primary operational amplifier with the output of said secondary operational amplifier when said reference potential at said node is positive and whereby said other device conducts when said reference potential at said node is negative to maintain said secondary amplifier in a condition to assume control of said primary amplifier promptly when the potential at said reference node becomes positive.

6. A control system comprising:

(a) a first operational amplifier having an input terminal and an output terminal and having capacitive and resistive feedback means connected therebetween;

(b) a second operational amplifier having an input terminal and an output terminal and having capacitive and resistive feedback means connected therebetween;

(c) an apparatus to be controlled connected with the output terminal of said first operational amplifier;

(d) first and second signal comparison means each having an output terminal respectively connected with said input terminal of said first and second operational amplifiers and each having two input terminals, each said comparison means providing at the output terminal thereof a voltage proportional to the difference in the signals at the input terminals thereof;

(e) first and second feedback means controlled by said apparatus and connected with respective ones of said input terminals of said comparison means for providing feedback signals thereto;

(f) means for providing command signals to the other of said input terminals of said comparison means;

(g) first and second output impedances defining a node therebetween connected between said amplifier output terminals; and (h) first and second unidirectional current conducting devices connected between said node and said input terminal of a respective operational amplifier, the anode of one said devices connected to said node and the cathode of the other said devices connected to said node, whereby said one device conducts to drive the input of said primary operational amplifier with the output of said secondary operational amplifier when said reference potential at said node is positive and whereby said other device conducts when said reference potential at said node is negative to maintain said secondary amplifier in a condition to assume control of said primary amplifier promptly when the potential at said reference node becomes positive.

References Cited

UNITED STATES PATENTS 3,405,676  10/1968  Hobbs et al. _____ 318—448

ROY LAKE, Primary Examiner

J. B. MULLINS, Assistant Examiner

U.S. Cl. X.R.

60—39.28; 318—18; 328—1, 104, 143